Patented Mar. 19, 1946

2,396,711

UNITED STATES PATENT OFFICE 2,396,711

PREPARATION OF ALKALINE-EARTH-METAL SALT OF SULPHADIAZINE

William A. Lott, Maplewood, N. J., assignor to E. R. Squibb & Sons, New York, N. Y., a corporation of New York No Drawing. Application April 17, 1942, Serial No. 439,387

2 Claims. (Cl. 260—239.6)

This application is a continuation-in-part of Lott and Bergeim application Serial No. 262,729, filed March 18, 1939.

This invention relates to, and has for its object the provision of, alkaline-earth-metal (including magnesium) salts of p-amino-benzene-sulphonamides, and a method of preparing them. These salts, especially the calcium salts of C-(p-amino-benzene-sulphonamido)-substituted N-heterocyclic compounds, are valuable water-soluble forms of the corresponding chemotherapeutic agents, being characterized by relatively low pH.

The p-amino-benzene-sulphonamides include, of course, sulphanilamide and the various sulphanilamide derivatives involving replacement of a hydrogen on the amino and/or amido by another group; for example, sulphapyridine, sulphathiazole, sulphadiazine, and p-benzamido-benzene-sulphonamide. Preferred are salts of compounds having an N-heterocyclic ring and having substituted on a nuclear C-atom thereof a p-amino-benzene-sulphonamido residue; for example, sulphapyridine, sulphathiazole, and sulphadiazine.

The compounds of this invention may be prepared by reacting the corresponding p-amino-benzene-sulphonamide and alkaline-earth-metal hydroxide (or oxide) in water, and recovering the thus-formed salt. Preferably, an excess of the p-amino-benzene-sulphonamide (over the theoretically-required amount) is used to guard against formation of a basic salt, and to assure that no unreacted alkaline-earth-metal hydroxide remains to crystallize out with the salt; preferably also, the salts are prepared under a carbon-dioxide-free (e. g., nitrogen) atmosphere, since carbon dioxide reacts with alkaline-earth-metal hydroxides and may decompose the product. It is desirable, furthermore, that the p-amino-benzene-sulphonamide used be of such purity that the alkaline-earth-metal salt need not be recrystallized (for the hydrolysis occurring during recrystallization makes for poor recovery).

Alternatively, the compounds of this invention may be prepared by reacting an alkali-metal salt of the corresponding p-amino-benzene-sulphonamide (e. g., sodium sulphathiazole) with a soluble alkaline-earth-metal salt (e. g., calcium chloride) in water, preferably in concentrated aqueous solution, filtering off the crystals formed, and drying the product in a vacuum desiccator at room temperature.

The following examples are illustrative of the invention:

Example 1

982 g. sulphathiazole and 141 g. calcium hydroxide are suspended in 3.4 liters of carbon-dioxide-free distilled water, and the mixture is stirred under a nitrogen atmosphere until practically-complete solution occurs. The insoluble material is then removed by suction filtration; and, on chilling the filtrate under a nitrogen atmosphere, the calcium salt of sulphathiazole separates, and is collected by suction filtration under a nitrogen atmosphere and dried in a vacuum over phosphorus pentoxide. A second fraction may be obtained by concentrating the mother liquor. The calcium salt of sulphathiazole is obtained as a white crystalline solid, which contains about three moles of water of hydration.

This salt (which, incidentally, yields about the same amount of sulphathiazole as sodium sulphathiazole sesquihydrate) is readily soluble in water, giving an about 10% solution at 37° C.; a 5% solution at room temperature is slightly unclear, but on being warmed for a few minutes at 37° C. gives a clear solution so remaining for many days and having a pH of about 8.7–8.9; and a 1% solution has a pH of about 8.5–8.7. In contrast, 5% and 1% solutions of sodium sulphathiazole sesquihydrate have pH's of 9.8 and 9.3–9.5, respectively.

Example 2

258 g. sulphadiazine and 37.5 g. calcium hydroxide are suspended in 3.5 liters of carbon-dioxide-free distilled water, and the mixture is heated and stirred under a nitrogen atmosphere until the temperature reaches 60° C., when most of the suspended material is dissolved; the insoluble material is removed by suction filtration; and the filtrate is distilled under reduced pressure, under nitrogen, until about 75% of the water has been removed. The residual solution is chilled under a nitrogen atmosphere, and the calcium salt of sulphadiazine which separates is collected by suction filtration under a nitrogen atmosphere, and dried in a vacuum over phosphorus pentoxide. A second fraction may be obtained by concentrating the mother liquor. The salt is obtained as a white crystalline solid, which contains about three moles of water of hydration and is readily soluble in water.

A large number of other alkaline-earth-metal salts of p-amino-benzene-sulphonamides may be prepared by the procedure of the foregoing examples, using the appropriate p-amino-benzene sulphonamides and alkaline-earth-metal hydroxides (or oxides), the following being further examples of such salts and of p-amino-benzene-sulphonamide reactants:

Additional examples of salts

Example 3.—Strontium sulphathiazole
Example 4.—Calcium sulphapyridine
Example 5.—The calcium salt of p-benzamido-benzene-sulphonamide
Example 6.—Magnesium sulphathiazole

Additional examples of p-amino-benzene-sulphonamide reactants 2-(p-amino-benzene-sulphonamido)-$\Delta^2$-thiazoline [also known as 2-sulphanilyl-aminothiazoline, or sulphathiazoline]
2-(p-amino-benzene-sulphonamido)-quinoline
2-(p-amino-benzene-sulphonamido)-4-methyl-thiazole
2-(p-amino-benzene-sulphonamido)-4,6-dimethyl-pyrimidine
2-(p-amino-benzene-sulphonamido)-4-methyl-pyrimidine
2-(p-amino-benzene-sulphonamido)-pyrazine The invention may be variously otherwise embodied within the scope of the appended claims.

I claim:

1. The method of preparing an alkaline-earth-metal salt of sulphadiazine which comprises reacting an alkaline-earth-metal hydroxide with sulphadiazine in water, under a carbon-dioxide-free atmosphere, the sulphadiazine being in excess of two moles per mole of alkaline-earth-metal hydroxide.

2. The method of preparing the calcium salt of sulphadiazine which comprises reacting calcium hydroxide with sulphadiazine in water, under a carbon-dioxide-free atmosphere, the sulphadiazine being in excess of two moles per mole of calcium hydroxide.

WILLIAM A. LOTT.